(12) United States Patent
Hsu et al.

(10) Patent No.: US 8,613,340 B2
(45) Date of Patent: Dec. 24, 2013

(54) ANTI-ROLLOVER MOTORIZED VEHICLE

(75) Inventors: Mau-Pin Hsu, Taipei (TW); Jyun-Jie Lin, Taipei (TW); Hsing-Hung Lee, Taipei (TW); Hsin-Wei Su, New Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 11 days.

(21) Appl. No.: 13/172,884

(22) Filed: Jun. 30, 2011

(65) Prior Publication Data

US 2013/0001001 A1    Jan. 3, 2013

(51) Int. Cl.
*B60G 21/05* (2006.01)
*B62D 61/08* (2006.01)

(52) U.S. Cl.
USPC ...... 180/215; 280/124.103; 280/62; 280/6.15

(58) Field of Classification Search
USPC ............... 180/215, 210; 280/124.103, 5.509, 280/5.508, 62, 6.15, 6.154, 87.042
IPC .................... B60G 21/05,61/08, 9/02
See application file for complete search history.

(56) References Cited

U.S. PATENT DOCUMENTS

| | | | | |
|---|---|---|---|---|
| 4,974,863 A | * | 12/1990 | Patin | 280/62 |
| 5,116,069 A | | 5/1992 | Miller | |
| 5,174,603 A | * | 12/1992 | Lund | 188/266.2 |
| 2008/0238005 A1 | * | 10/2008 | James | 280/5.509 |

FOREIGN PATENT DOCUMENTS

TW    I274677    3/2007

\* cited by examiner

*Primary Examiner* — Keith Frisby
(74) *Attorney, Agent, or Firm* — Jianq Chyun IP Office

(57) ABSTRACT

An anti-rollover motorized vehicle includes a chassis, a front wheel and a rear two wheels assembly including a tilting base and a four-bar linkage structure. The tilting base is connected to the chassis through a supporting structure. The four-bar linkage structure suitable for connecting the chassis with two rear wheels includes first, second, third and fourth linkages. The first and second linkages are pivoted to the tilting base. The third and fourth linkages pivoted to two ends of the first and second linkages respectively are connected to the supporting brackets of the two rear wheels respectively. When the chassis is tilted, the tilting base and the supporting structure are also tilted, the first and second linkages are maintained at a constant angle relative to a road surface, and the third and fourth linkages are also tilted, such that track width of the two tilting rear wheels is maintained.

13 Claims, 14 Drawing Sheets

ANTI-ROLLOVER MOTORIZED VEHICLE

BACKGROUND

1. Field of the Disclosure

The present disclosure relates to a motorized vehicle. More particularly, the present disclosure relates to an anti-rollover motorized vehicle with agile operating and highly safety performance.

2. Description of Related Art

The population density of Taiwan is high, and lots of people in Taiwan regard motorcycles as main personal transportation tools. However, many road conditions are unfavourable for driving. For example, wet and slippery roads, sands on the roads, crushed stones, rough roads, jolting roads, muddy roads, or narrow, steep or curved roads due to landform, often cause traffic accidents in Taiwan as well as in other countries. While being confronted with the road conditions above mentioned, three-wheeled motorized vehicles with conventional designs are likely to be out of control or roll over resulting in some traffic accidents. Based on these conventional designs, there are no effective methods to avoid the accidents due to out of control or rollover of motorized vehicles as above mentioned. As U.S. Pat. No. 5,116,069 discloses, the motorized vehicle needs to employ an oil pressure pump to drive and control the right and left oil pressure cylinders for tilting the vehicle, wherein extra power has to be provided to this kind of design, such that not only the structure is more complicated but also the cost is much higher. Furthermore, as Taiwan Patent No. I274677 discloses, the tilting mechanism is a trapezoid four-bar linkage, wherein the track width changes when the vehicle is tilted, and the change of the track width increases the difficulty of driving and controlling the vehicle to be tilted and restored to upright posture. Moreover, the shock absorbing systems of this patent are independent from each other, such that the tilting angle is affected and driving safety is likely to be affected.

Nowadays, some new designs of motorized vehicle are presented to the public, for example, Piaggio MP3 or Carver, etc. Piaggio MP3 is a kind of motorized vehicle with two front wheels, whereas when it makes a turn, the right and left wheels would side slip against each other on the road, making the tires wear out excessively and lose vehicle speed needlessly. Although the Carver is a tilting motorized vehicle with two rear wheels, but the rear portion of the vehicle and the two rear wheels can not be tilted. Furthermore, both the Piaggio MP3 and the Carver use many complicated electronic sensors, electronic controllers and even need to employ a microcomputer to calculate and drive, resulting in very high manufacturing cost. Also, an ordinary driver is incapable of preventing the vehicle from out of controlling once some of the electronic elements above mentioned broke down. The vehicles above mentioned thus not only become expensive toys for rich people but also are unable to become truly assistive vehicles for the physically handicapped people or benefiting the general public with affordable prices.

Thus, for handling the various road conditions above mentioned, increasing the safety of this kind of motorized vehicles, benefiting physically handicapped people and providing the general public an affordable commuting tool with the pleasure of easy driving, an anti-rollover motorized vehicle with simple mechanism and low cost needs to be developed.

SUMMARY

The present disclosure is directed to an anti-rollover motorized vehicle with simple mechanism and low cost.

The present disclosure is also directed to an anti-rollover motorized vehicle, which combines the tilting agility of a two-wheeled motorized vehicle and the upright stability of a three-wheeled motorized vehicle, and does not have the disadvantage of slipping down easily by a two-wheeled motorized vehicle and the disadvantage of rolling over easily by a three-wheeled motorized vehicle. In this way, this disclosed vehicle can provide superb safety as far as handling is concerned.

The present disclosure provides an anti-rollover motorized vehicle including a chassis, a front wheel and a two-rear-wheel assembly. The two-rear-wheel assembly includes a tilting base and a four-bar linkage structure. The tilting base is connected to the chassis through a first supporting structure. The four-bar linkage structure is suitable for connecting the chassis with two rear wheels and includes the first, second, third and fourth linkages. The first linkage is pivoted to the tilting base and suitable for being pivoted relatively to the tilting base. The second linkage is disposed under and parallel to the first linkage, and is also pivoted to the tilting base, wherein the second linkage is suitable for being pivoted with respect to the tilting base. The third and fourth linkages are pivoted to two ends of the first and second linkages respectively and connected to supporting brackets of the two rear wheels respectively. The anti-rollover motorized vehicle further includes two shock absorbers connected to the chassis through a second supporting structure, such that the two rear wheels are suitable for being tilted with the chassis. When the chassis is tilted, the tilting base, the first supporting structure and the two shock absorbers are tilted together with the chassis, the first and second linkages are maintained at a constant angle relative to a road surface, and the third and fourth linkages are tilted with the chassis, such that the two rear wheels are also tilted with the chassis. In addition, while the track width between the two rear wheels is maintained, the shock absorbers make the four-bar linkage structure to be provided with shock absorbing effect.

In order to make the aforementioned and other features and advantages of the present disclosure comprehensible, several exemplary embodiments accompanied with figures are described in details below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DETAILED DESCRIPTION OF DISCLOSED EMBODIMENTS

Figure 1:
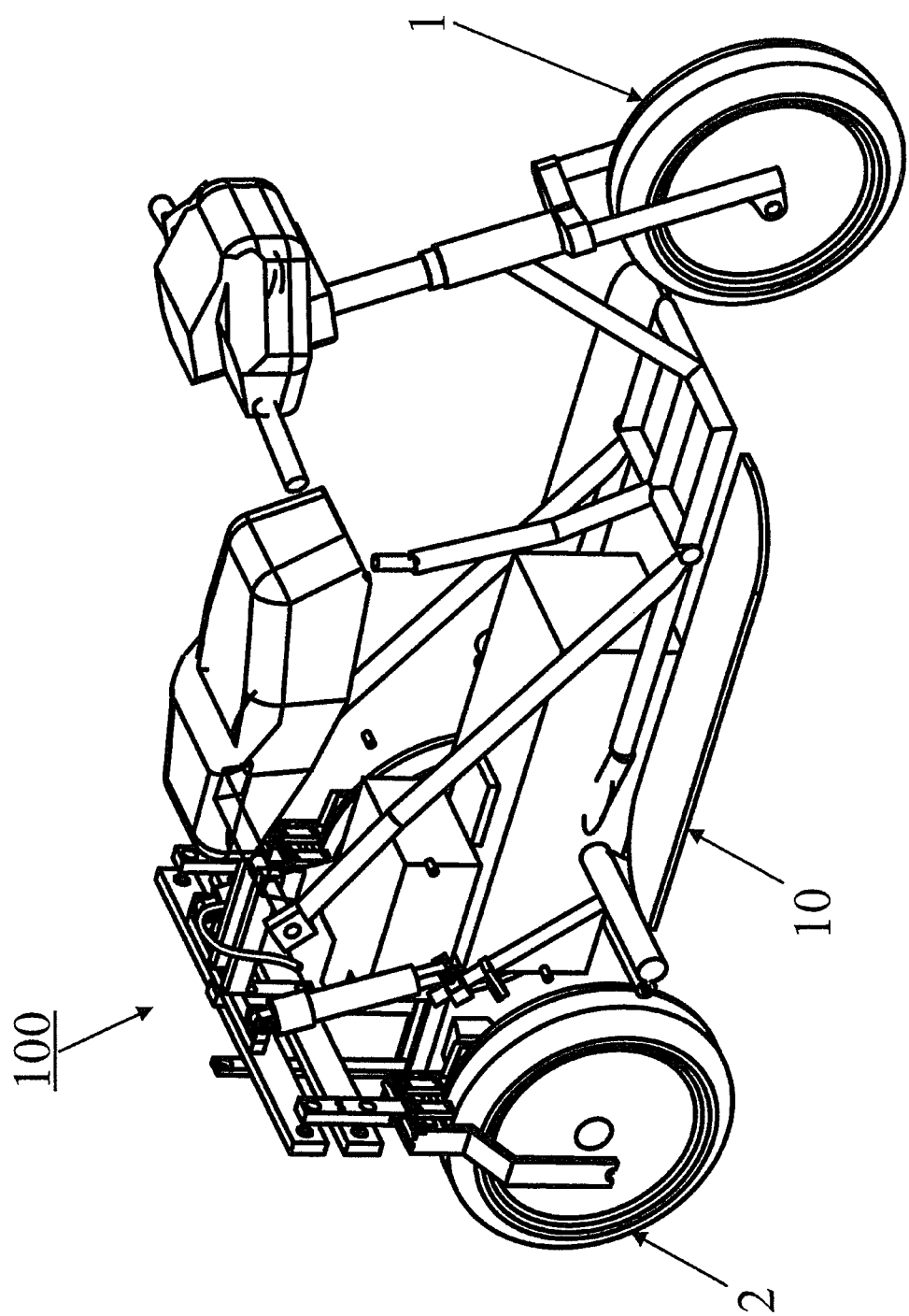
FIG. 1 is a right-front view three-dimensional diagram of an anti-rollover motorized vehicle using a four-bar linkage structure according to the first embodiment of the invention.
Figure 2:
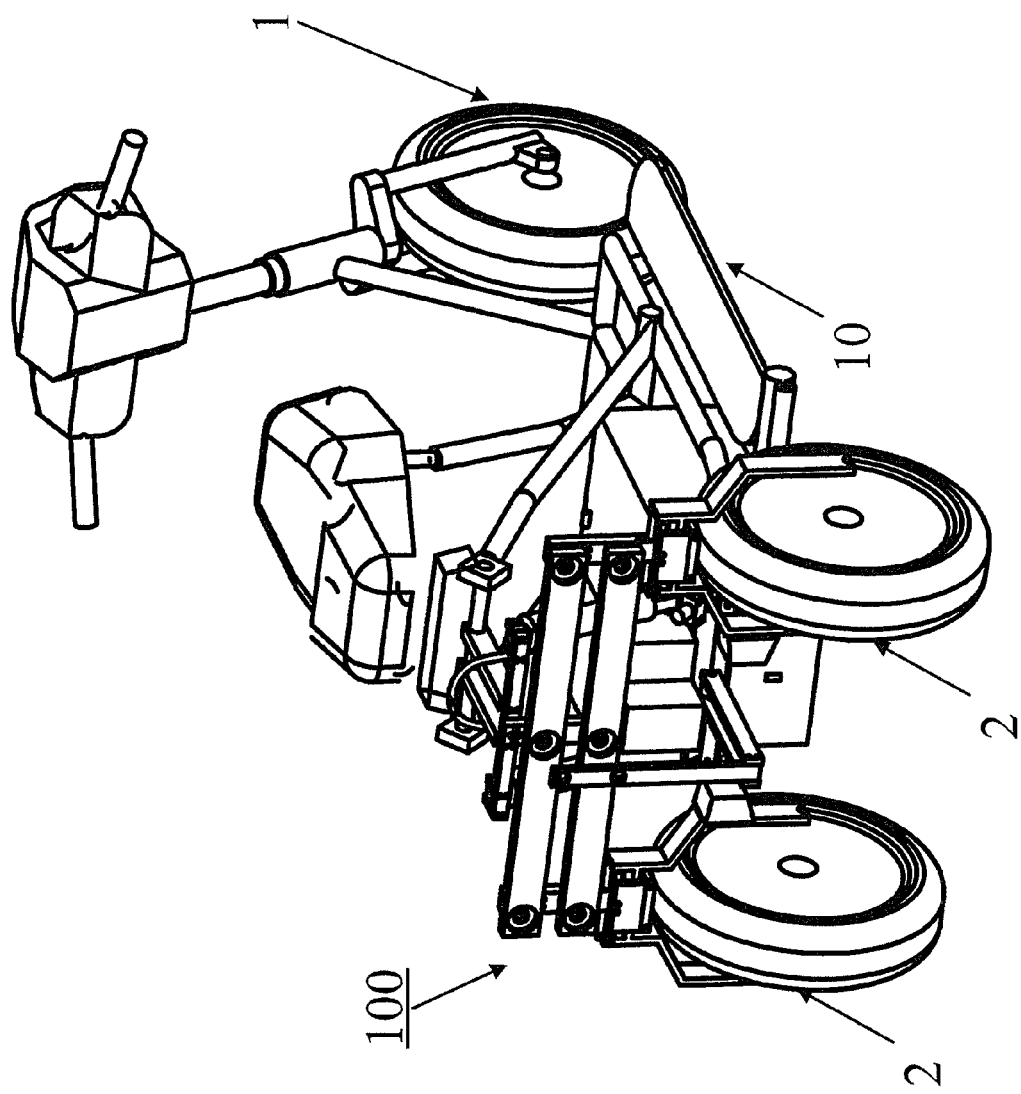
FIG. 2 is a rear view three-dimensional diagram of an anti-rollover motorized vehicle using a four-bar linkage structure according to the first embodiment of the invention.

Referring to FIG. 1 and FIG. 2 of the invention, FIG. 1 is a right-front view three-dimensional diagram of an anti-rollover motorized vehicle using a four-bar linkage structure according to the first embodiment of the invention. FIG. 2 is a rear view three-dimensional diagram of an anti-rollover motorized vehicle using a four-bar linkage structure according to the first embodiment of the invention. As FIG. 1 and FIG. 2 showing, in the first embodiment, the anti-rollover motorized vehicle of the invention includes a chassis 10, a front wheel 1, two rear wheels 2 and a four-bar linkage structure 100. The four-bar linkage structure 100 is suitable for connecting the chassis 10 with the two rear wheels 2 (described hereafter). When the anti-rollover motorized vehicle of the invention makes a turn, the four-bar linkage structure 100 not only can maintain the stability of the chassis 10 which is tilted but also maintains the track width of the two rear wheels 2 by nature of the parallel four-bar linkage structure 100. Thus, not only the abnormal wear of the two rear tires 2 and loss of speed are prevented in the middle of tilting, but also precise control of vehicle cornering is enhanced when tilting in and restoring back to the upright posture.

Figure 3:
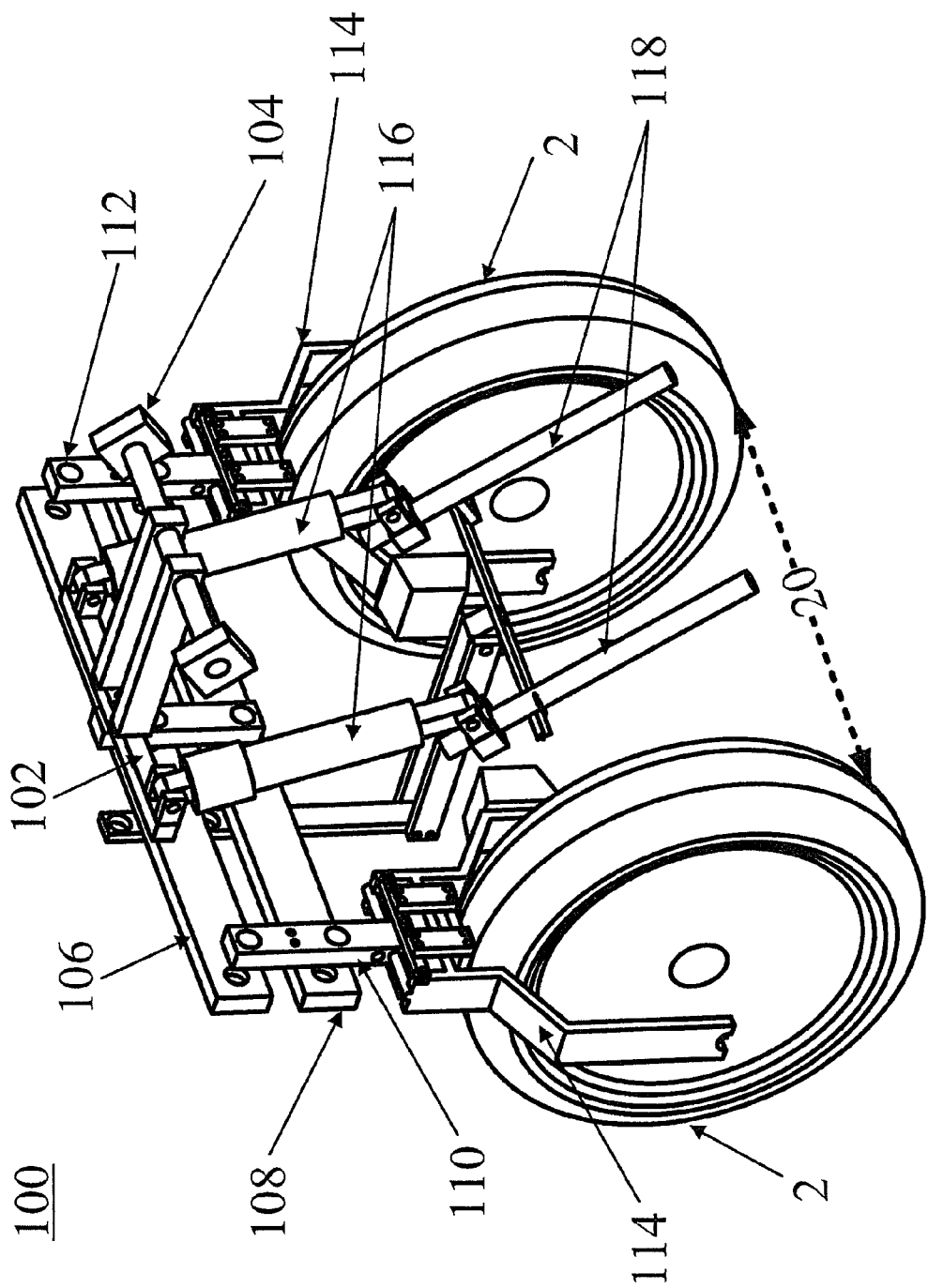
FIG. 3 is a three-dimensional diagram of a four-bar linkage structure according to the first embodiment of an anti-rollover motorized vehicle of the invention.
Figure 4:
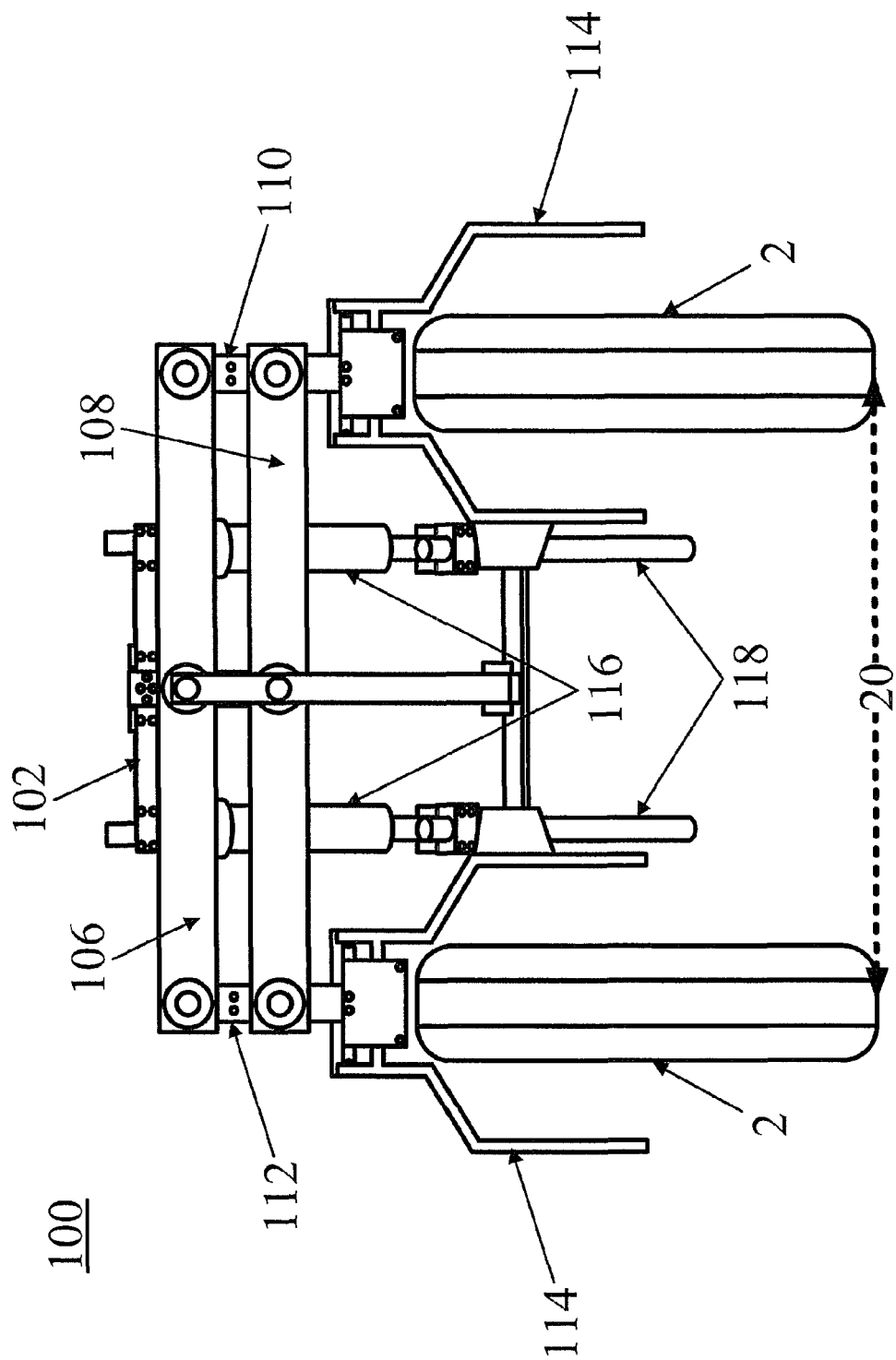
FIG. 4 is a rear view of a four-bar linkage structure according to the first embodiment of the invention shown in FIG. 3.
Figure 5:
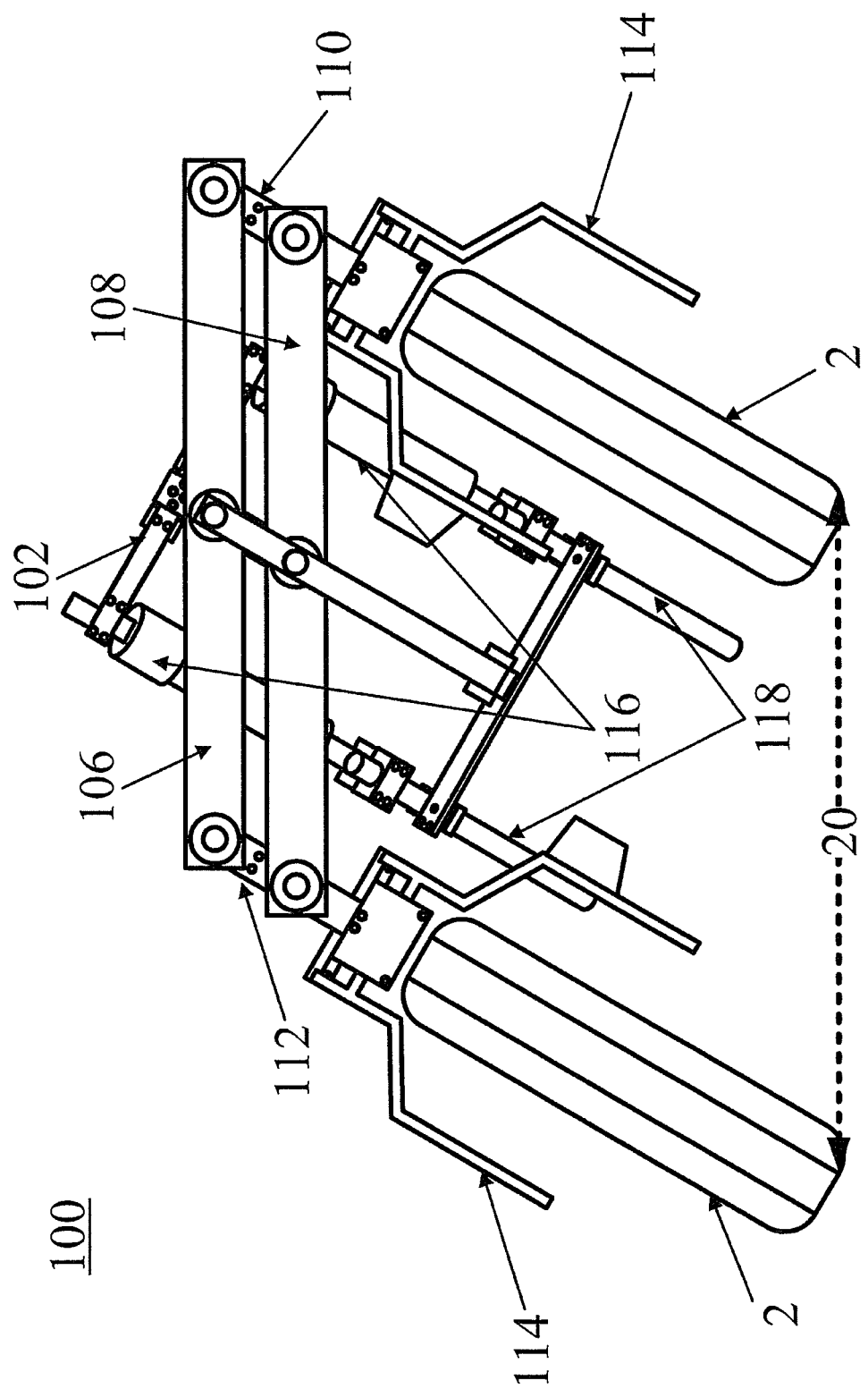
FIG. 5 shows that a four-bar linkage structure according to the first embodiment of the invention shown in FIG. 3 is tilted.

Referring to FIG. 3 to FIG. 5, FIG. 3 is a three-dimensional diagram of a four-bar linkage structure according to the first embodiment of an anti-rollover motorized vehicle of the invention. FIG. 4 is a rear view of a four-bar linkage structure according to the first embodiment of the invention as shown in FIG. 3. FIG. 5 depicts the tilting posture of a four-bar linkage structure according to the first embodiment of the invention as shown in FIG. 3.

In the first embodiment, the anti-rollover motorized vehicle includes a four-bar linkage structure 100 and a tilting base 102. The tilting base 102 is pivoted to the chassis 10 through a first supporting structure 104. The four-bar linkage structure 100 is used to connect the chassis 10 with the two rear wheels 2. The four-bar linkage structure 100 includes a first linkage 106, a second linkage 108, a third linkage 110 and a fourth linkage 112. As shown in FIG. 3, the first linkage 106 is pivoted to the tilting base 102 and able to rotate with respect to the tilting base 102. The second linkage 108 is disposed under and parallel to the first linkage 106. The third linkage 110 and the fourth linkage 112 are respectively pivoted to the two ends of the first linkage 106 and the second linkage 108 and respectively connected to the two supporting brackets 114 of the two rear wheels 2.

The anti-rollover motorized vehicle of the invention further includes two shock absorbers 116. The two shock absorbers 116 are pivoted to the chassis 10 through a second supporting structure 118 and also pivoted to the tilting base 102 in order that the suspension as well shock absorption effects can function suitably between the four-bar linkage structure 100 (together with the two rear wheels) and the chassis 10. Further, the shock absorbers 116 of the first embodiment are installed in a manner such that the tilting angle of the vehicle body is not affected while turning on undulated pavements. Referring to FIG. 4 and FIG. 5, when the anti-rollover motorized vehicle of the invention makes a turn and the chassis 10 is tilted, the tilting base 102, the first supporting structure 104, the two shock absorbers 116 and the second supporting structure 118 are tilted with the chassis 10, the first linkage 106 and the second linkage 108 are kept parallel with the pavement, and the third linkage 110 and the fourth linkage 112 are tilted with the tilting base 102 and the chassis 10, such that the track width of the two rear wheels 2, also tilted with the chassis 10, is maintained.

Worth of mentioning, since the track width of the two rear wheels 2 is able to be maintained no matter the anti-rollover motorized vehicle of the invention is driven straight or makes a turn, abnormal wear on the two rear tires will not happen as it would based on the conventional technique. Further, because the four-bar linkage structure 100 has simple structure and is provided with shock absorbing effect by using the shock absorbers 116, the driver can have very precise and keen control on the handling for the vehicle when either tilting down or restoring back to upright, while making turns. In addition, this invention is different from some other conventional techniques which are driven by complicated electronic sensors, electronic controllers or even micro-computers. In summary, the anti-rollover motorized vehicle of the invention not only combines the tilting/restoring agility of a two-wheeled motorized vehicle and the stability of a three-wheeled motorized vehicle, but also eliminates the disadvantage of slipping down of a two-wheeled motorized vehicle and disadvantage of rolling over of a three-wheeled motorized vehicle. Thus, high safety on stability and handling are both ensured.

Figure 6:
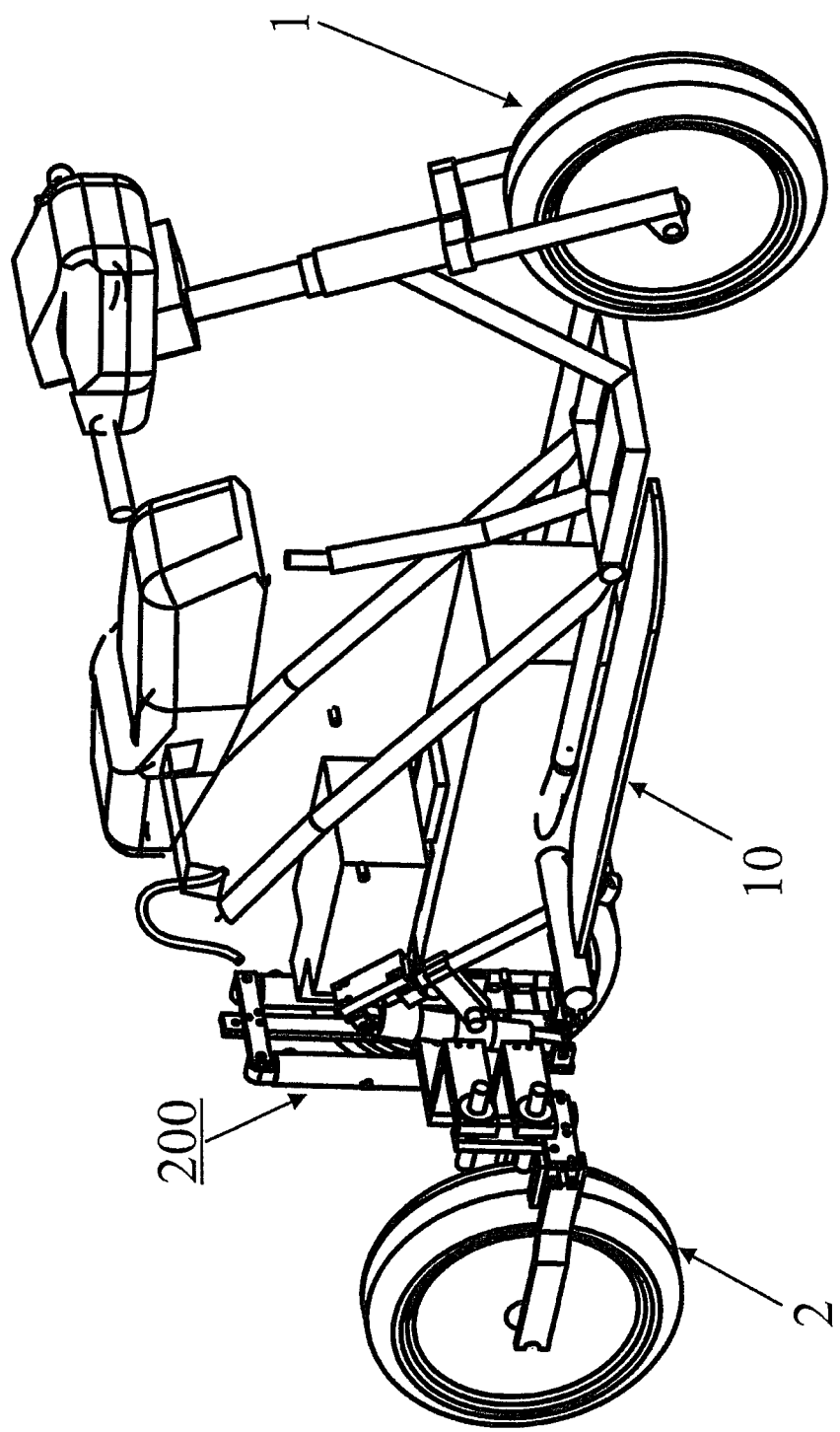
FIG. 6 is a right-front view three-dimensional diagram of an anti-rollover motorized vehicle using a four-bar linkage structure according to the second embodiment of the invention.
Figure 7:
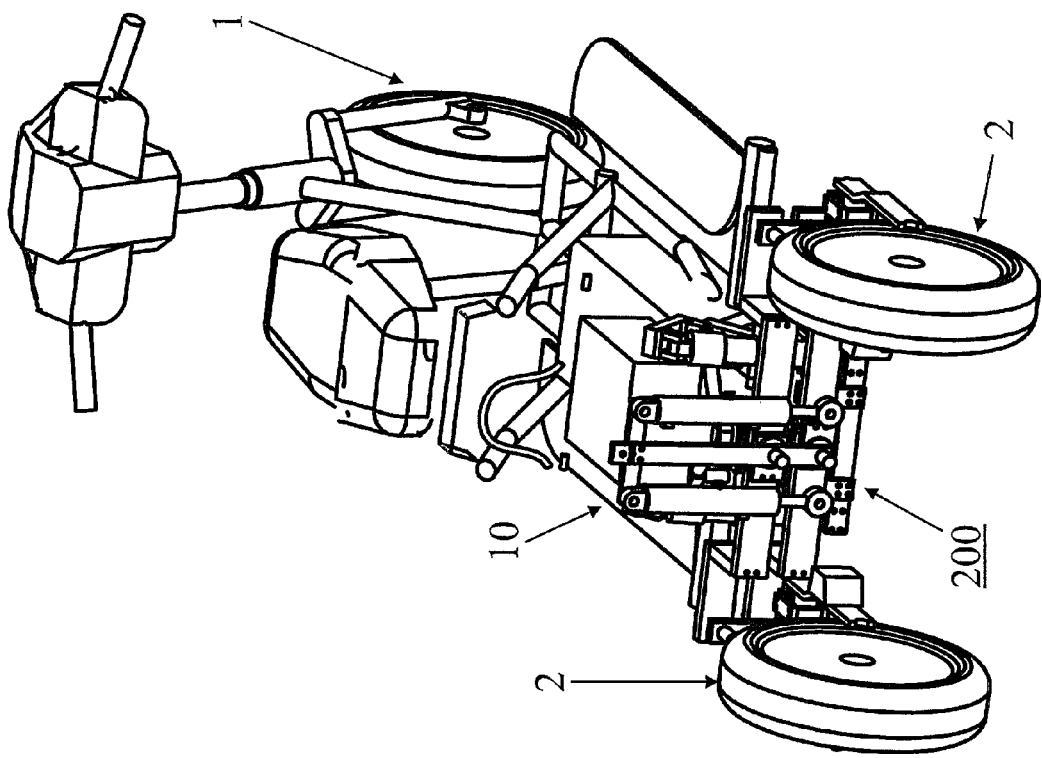
FIG. 7 is a rear view three-dimensional diagram of an anti-rollover motorized vehicle using a four-bar linkage structure according to the second embodiment of the invention.

Referring to FIG. 6 and FIG. 7 of the invention, FIG. 6 is a right-front view three-dimensional diagram of an anti-rollover motorized vehicle using a four-bar linkage structure according to the second embodiment of the invention. FIG. 7 is a rear view three-dimensional diagram of an anti-rollover motorized vehicle using a four-bar linkage structure according to the second embodiment of the invention. In the second embodiment, the anti-rollover motorized vehicle of the invention includes a chassis 10, a front wheel 1, two rear wheels 2 and a four-bar linkage structure 200. Similarly, the four-bar linkage structure 200 is suitable for connecting the chassis 10 with the two rear wheels 2 (described hereafter). When the anti-rollover motorized vehicle of the invention makes a turn, the four-bar linkage structure 200 not only can maintain the stability of the tilting chassis 10 but also maintains the track width of the two rear wheels 2 by nature of the four-bar linkage structure 200. Thus, not only the abnormal wear of the two rear tires 2 and loss of speed are prevented in the middle of tilting, but also precise control of vehicle cornering is enhanced when tilting in and restoring back to upright posture.

Figure 8:
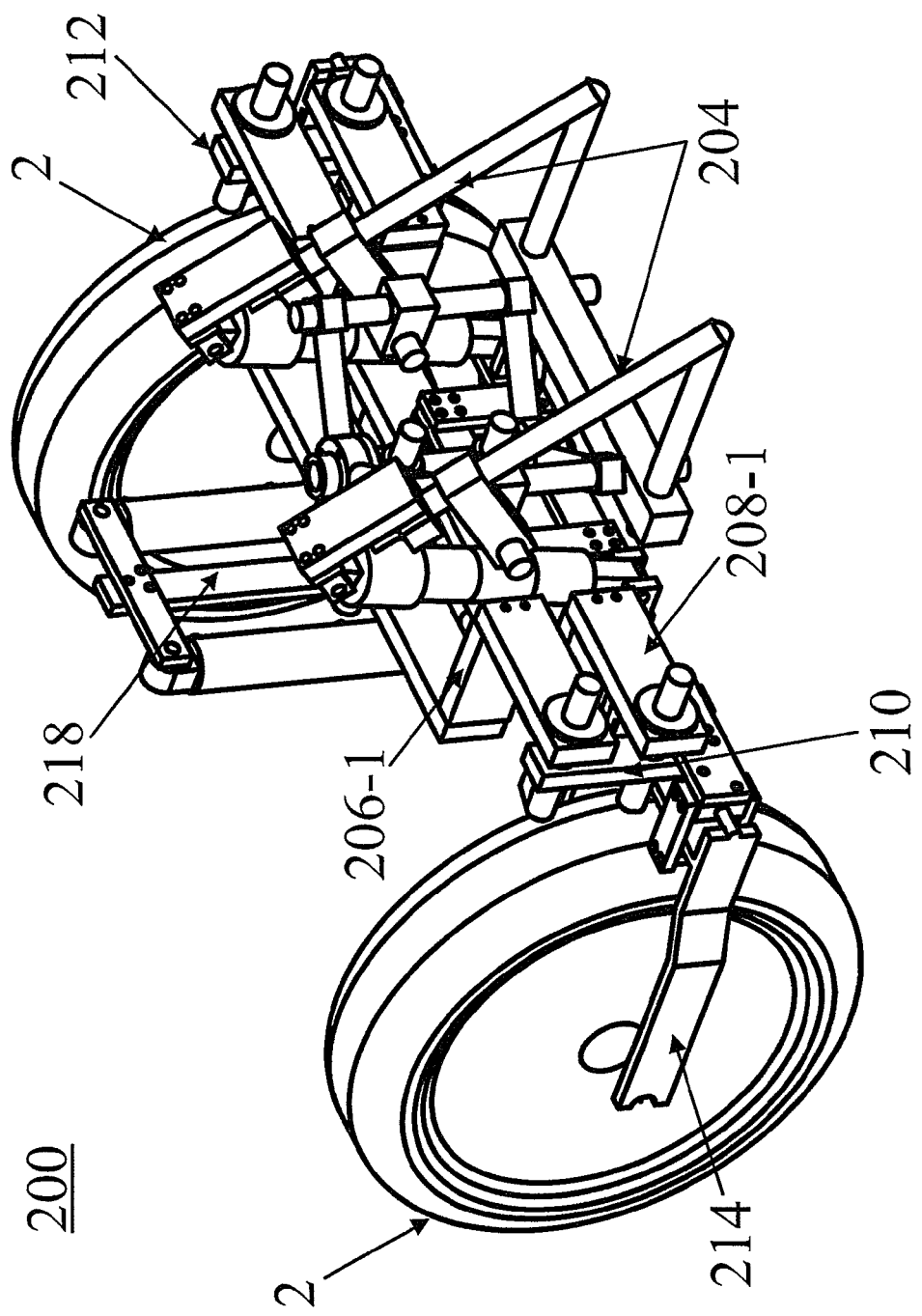
FIG. 8 is a three-dimensional diagram of a four-bar linkage structure according to the second embodiment of an anti-rollover motorized vehicle of the invention.
Figure 9:
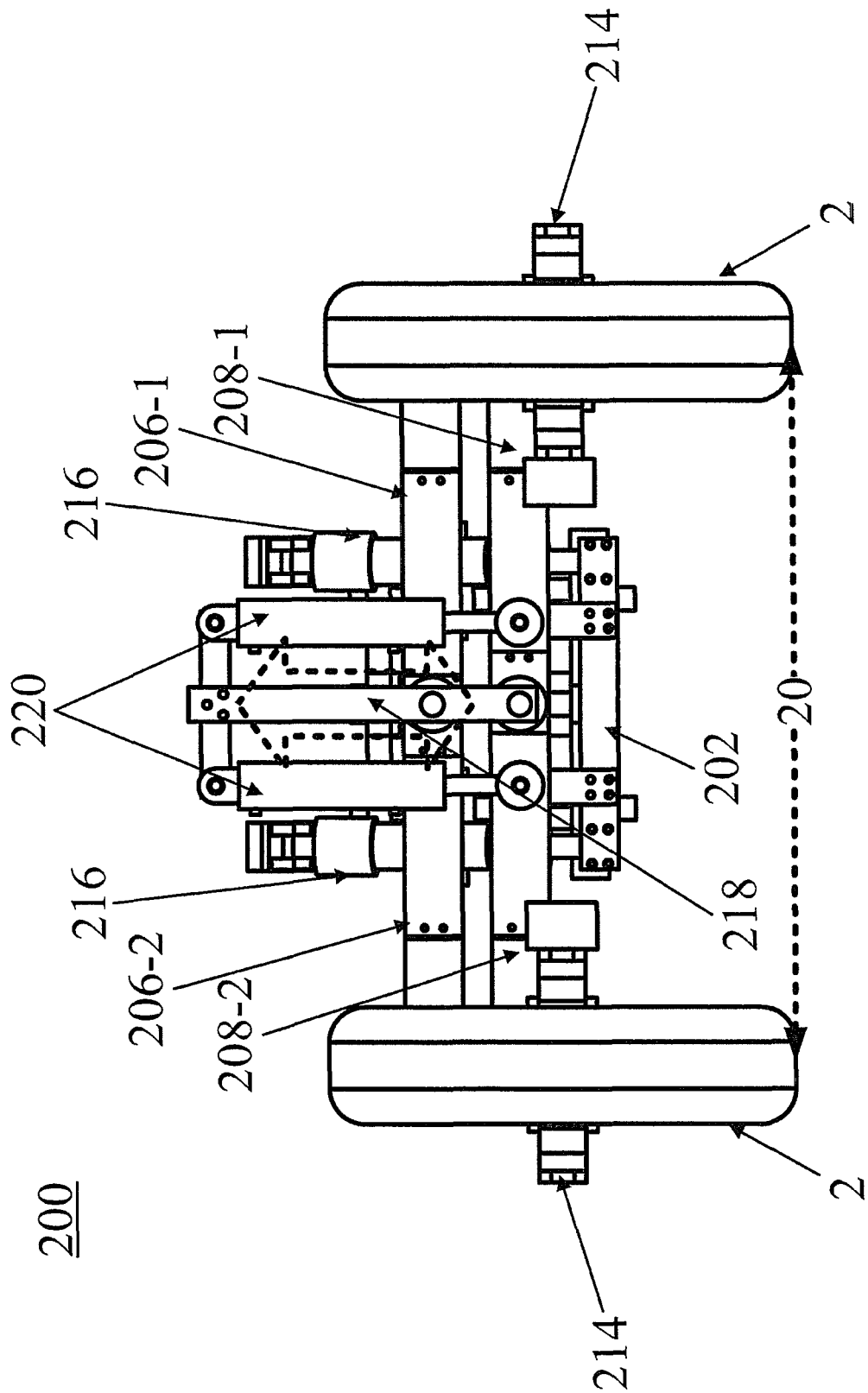
FIG. 9 is a rear view of a four-bar linkage structure according to the second embodiment of the invention shown in FIG. 8.
Figure 10:
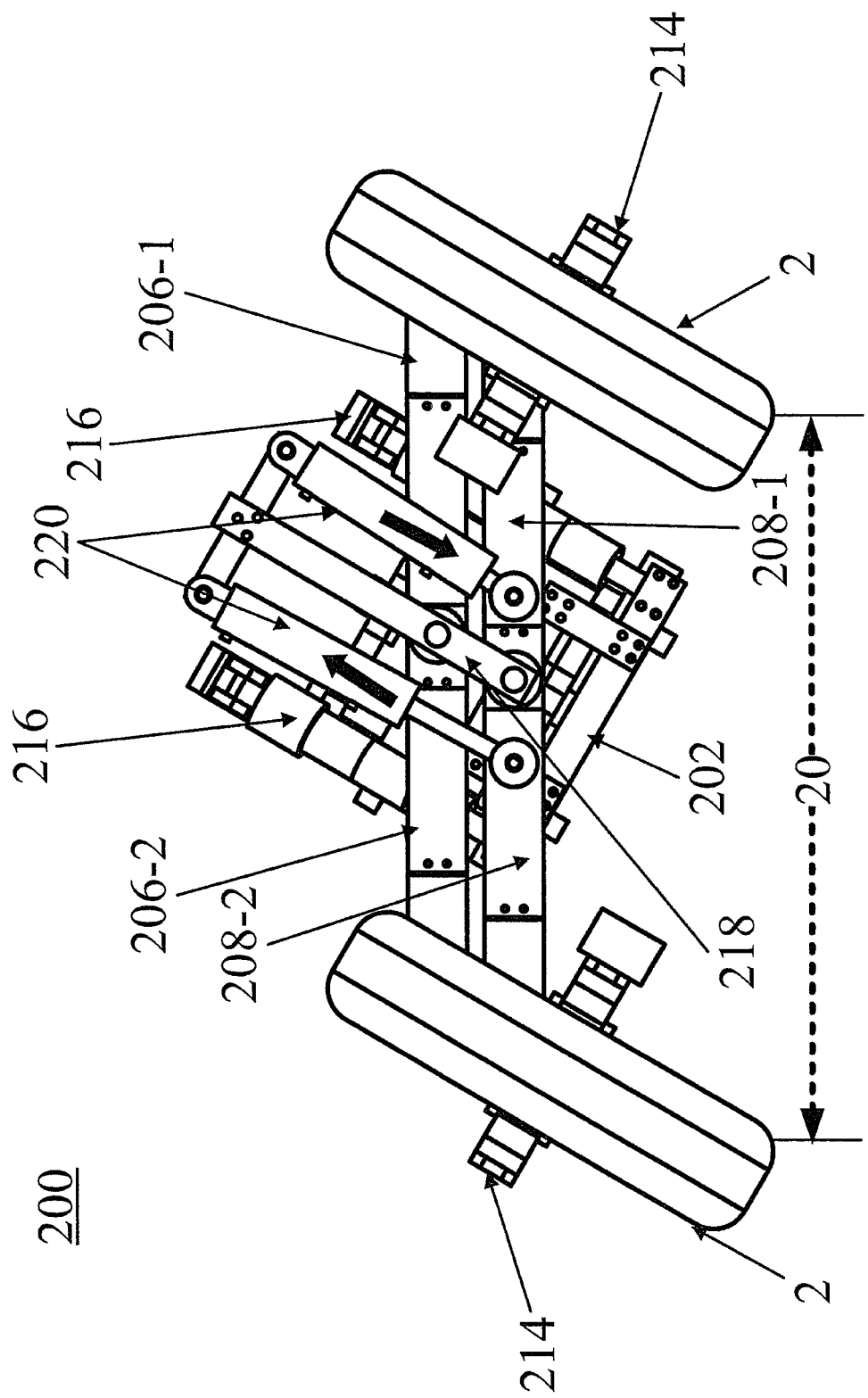
FIG. 10 shows that a four-bar linkage structure according to the second embodiment of the invention shown in FIG. 8 is tilted.

Referring to FIG. 8 to FIG. 10, FIG. 8 is a three-dimensional diagram of an four-bar linkage structure according to the second embodiment of an anti-rollover motorized vehicle of the invention. FIG. 9 is a rear view of a four-bar linkage structure according to the second embodiment of the invention shown in FIG. 8. FIG. 10 depicts the tilting posture of the four-bar linkage structure according to the second embodiment of the invention as shown in FIG. 8.

In the second embodiment, the anti-rollover motorized vehicle includes a four-bar linkage structure 200 and a tilting base 202. The tilting base 202 is connected to the chassis 10 through a supporting structure 204. The four-bar linkage structure 200 is suitable for connecting the chassis 10 with the two rear wheels 2. The four-bar linkage structure 200 includes a first right linkage 206-1, a first left linkage 206-2, a second right linkage 208-1, a second left linkage 208-2, a third linkage 210 and a fourth linkage 212. As shown in FIG. 9, the first right linkage 206-1, the first left linkage 206-2, the second right linkage 208-1 and the second left linkage 208-2 are pivoted on the tilting base 202 and suitable for being pivoted relatively to the tilting base 202. The first right linkage 206-1, the first left linkage 206-2, the second right linkage 208-1 and the second left linkage 208-2 are pivoted to each other through a T-shape frame 218 as shown in FIG. 8 to FIG. 10, and form a right four-bar linkage structure and a left four-bar linkage structure located at two opposite sides of the T-shaped frame 218 respectively. The third linkage 210 and the fourth linkage 212 are respectively pivoted to two ends of the first right linkage 206-1 and the second right linkage 208-1, and the first left linkage 206-2 and the second left linkage 208-2. Further, the third linkage 210 and the fourth linkage 212 are respectively connected to supporting brackets 214 of the two rear wheels 2.

Figure 11:
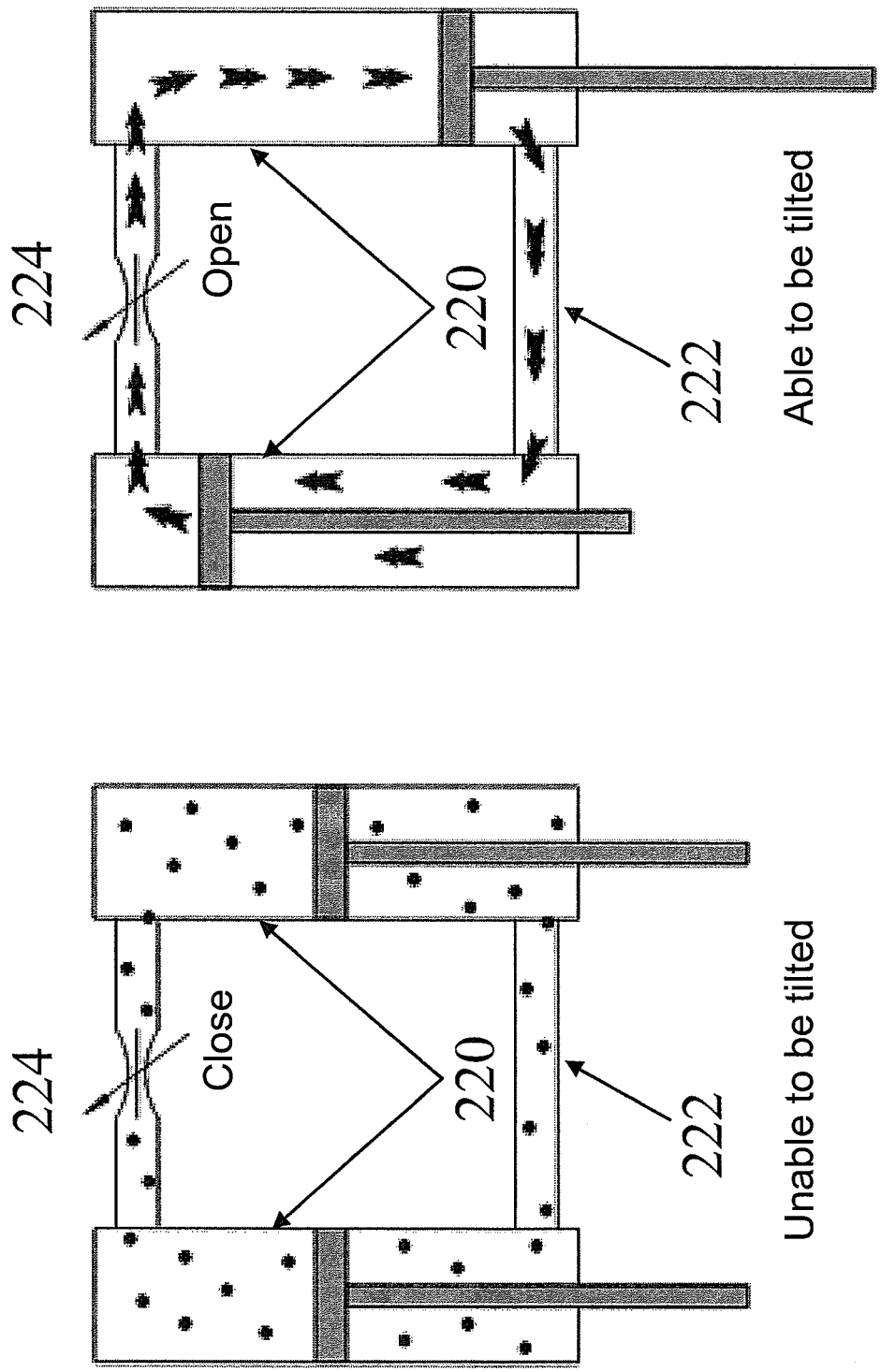
FIG. 11 is a schematic diagram of hydraulic pressure elements, an hydraulic pipe and a solenoid valve of a hydraulic pressure system according to the second embodiment of the invention.

In this embodiment, the anti-rollover motorized vehicle further includes two shock absorbers 216. The two shock absorbers 216 are pivoted to the chassis 10 through the supporting structure 204 and pivoted to the tilting base 202 to be suitable for being pivoted relatively to the four-bar linkage structure 200. In addition, the anti-rollover motorized vehicle further includes a hydraulic pressure system including two hydraulic pressure elements 220. As shown in FIG. 9, one end of each hydraulic pressure element 220 is pivoted to the T-shaped frame 218, and the other ends of the hydraulic pressure elements 220 are respectively pivoted to the second right linkage 208-1 and the second left linkage 208-2 (or respectively pivoted to the first right linkage 206-1 and the first left linkage 206-2). When the chassis 10 is tilted, the two hydraulic pressure elements 220 are able to drive the right four-bar linkage structure and the left four-bar linkage structure (i.e., the first right linkage 206-1, the first left linkage 206-2, the second right linkage 208-1 and the second left linkage 208-2). Referring to FIG. 11 is a schematic diagram of a hydraulic pressure system according to a second embodiment of the invention. This hydraulic pressure system comprises two hydraulic pressure elements, a hydraulic pipe and a solenoid valve. In the second embodiment, the anti-rollover motorized vehicle further includes a hydraulic pressure system comprising two hydraulic pressure elements. As shown in FIG. 9, the hydraulic pressure elements 220 are installed between the T-shaped frame 218 and the second linkage 208 (or the first linkage 206). Two hydraulic pipes 222 suitable for connecting the two hydraulic pressure elements are located in between the two hydraulic pressure elements. As shown in FIG. 11, one hydraulic pipe 222 includes a solenoid valve 224 suitable for controlling the flow of the hydraulic pipe 222 in between the two hydraulic pressure elements. Stopping the flow by the solenoid valve can fix the tilting angle of the whole. In other words, when the anti-rollover motorized vehicle of the invention is parked across on a banked road surface (such as on a banked road shoulder), the driver would first keep the vehicle in an upright posture and then switch off the solenoid valve 224 to stop the flow of the hydraulic liquid. In this way, the vehicle body is able to be maintained in its upright posture stably. In general, a tilting three-wheeled vehicle of this kind, like those two-wheeled vehicles, would wobble and weave when travelling at very low speed. By shutting off the solenoid valve at the exact moment when the vehicle is in the upright posture can completely stablize the vehicle and keep it travel in a straight line path even at very low speed. The closing and opening of the flow path by the solenoid valve can be controlled either manually or by a pre-programmed electronic device.

Figure 12:
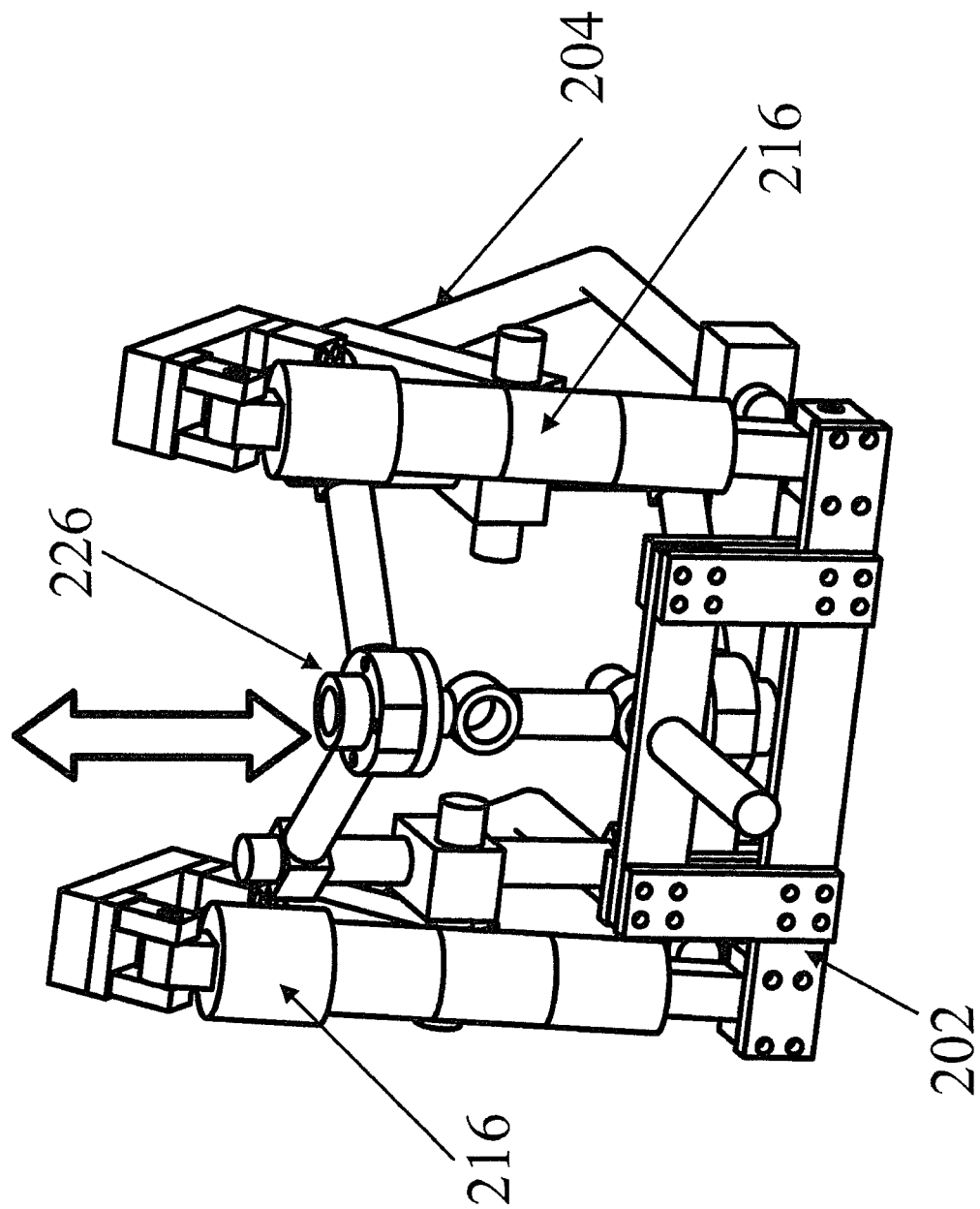
FIG. 12 is a rear view three-dimensional diagram of tilting base, supporting structure and shock absorbers according to the second embodiment of the invention.

FIG. 12 is a rear view three-dimensional diagram of the tilting base 202, the supporting structure 204 and the shock absorbers 216 according to the second embodiment of the invention. As shown in FIG. 12, the second embodiment of the invention uses a linear slide 226, wherein the tilting base 202 is suitable for moving up and down through the linear slide 226, to make the supporting structure 204 and the shock absorbers 216 able to move up and down as well. In this way, the four-bar linkage structure 200 is provided with shock absorbing effect. Furthermore, since the shock absorbers 216 of the second embodiment are installed in such a manner, the tilting angle of the vehicle body is not affected and the track width of the two rear wheels 2 is not changed by pavement irregularities while cornering.

Comparing FIG. 9 and FIG. 10, when the anti-rollover motorized vehicle of the invention makes a turn on level pavements and the chassis 10 is tilted, the tilting base 202, the supporting structure 204, the two shock absorbers 216, the T-shaped frame 218 and the two hydraulic pressure elements 220 are all tilted together with the chassis 10, and the first right linkage 206-1, the first left linkage 206-2, the second right linkage 208-1 and the second left linkage 208-2 will be maintained in a horizontal status. In addition, as shown by the two black arrows in FIG. 10, through the stretching and shrinking of the two hydraulic pressure elements 220 of the second embodiment of the invention, the hydraulic pressure system is able to drive the first right linkage 206-1, the first left linkage 206-2, the second right linkage 208-1 and the second left linkage 208-2, such that their horizontal statuses are maintained. The third linkage 210 and the fourth linkage 212 are tilted with the tilting base 202 and the chassis 10, such that the track width of the two rear wheels 2 tilted with the chassis 10 is maintained. Thus, the anti-rollover motorized vehicle of the invention not only combines the tilting/restoring agility of a two-wheeled motorized vehicle and the stability of a three-wheeled motorized vehicle, but also eliminates the disadvantage of slipping down of a two-wheeled motorized vehicle and disadvantage of rolling over of a three-wheeled motorized vehicle. Thus, high safety on stability and handling are both ensured.

Figure 13:
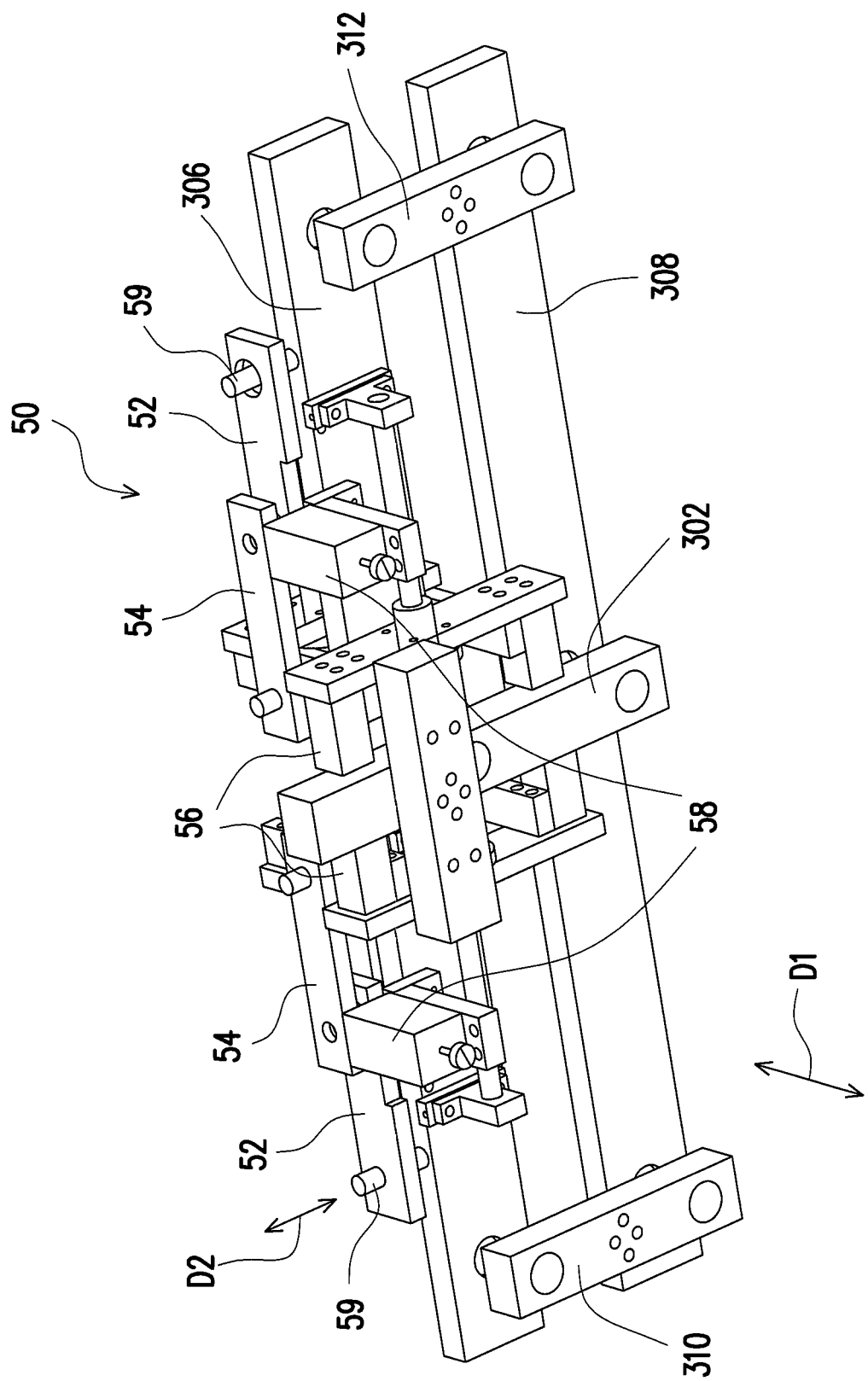
FIG. 13 is a three-dimensional diagram showing partial components of an anti-rollover motorized vehicle according to the third embodiment of the invention.
Figure 14:
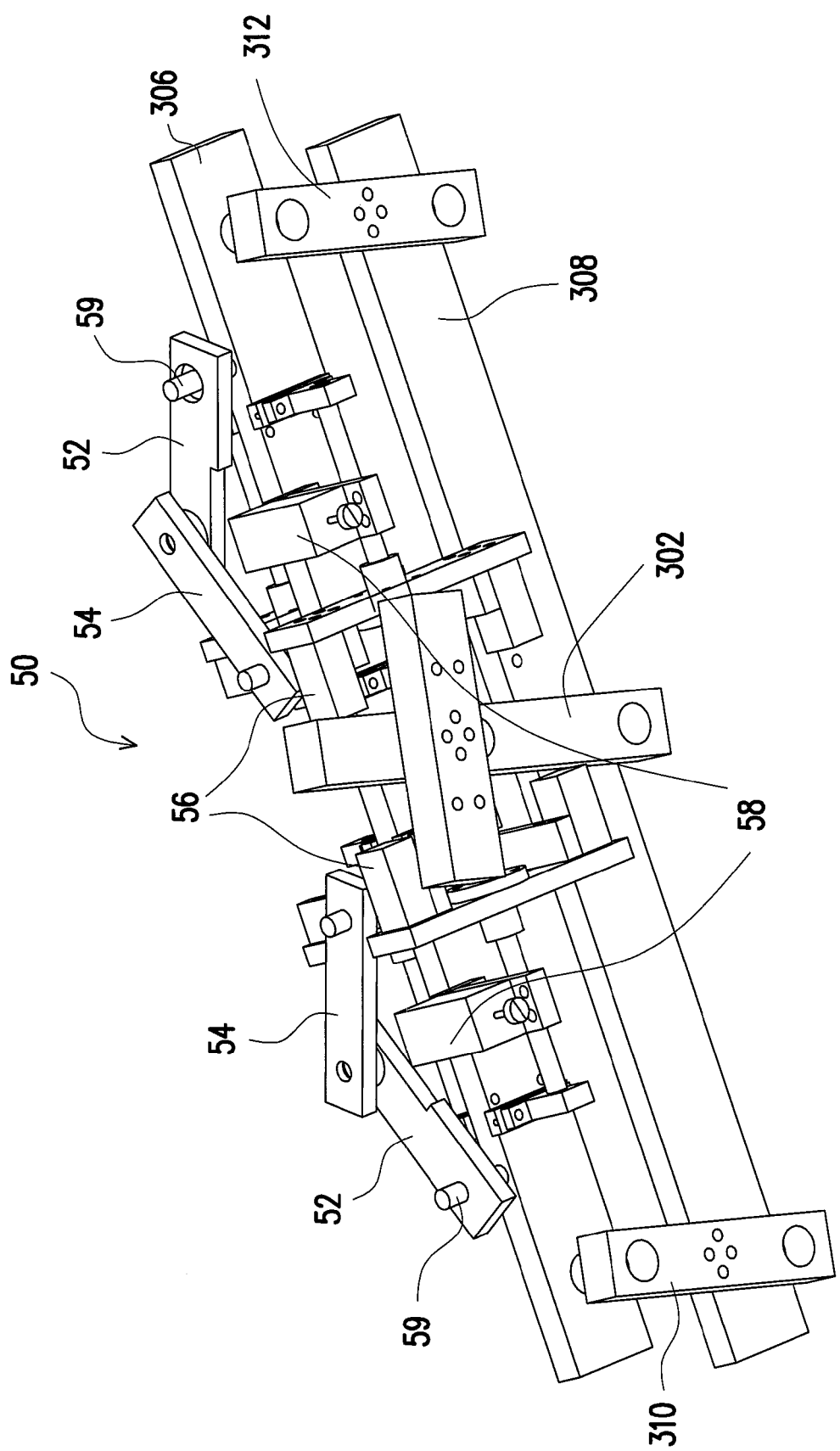
FIG. 14 indicates the unlocking status of the parking/locking mechanism, as shown in FIG. 13, which allows the vehicle to be tilted to either side.

FIG. 13 is a three-dimensional diagram showing partial components of a anti-rollover motorized vehicle according to the third embodiment of the invention. FIG. 14 depicts that the parking/locking mechanism shown in FIG. 13 is operated. Referring to FIG. 13, the connecting and operating manner of the tilting base 302, the first linkage 306, the second linkage 308, the third linkage 310 and the fourth linkage 312 in the third embodiment are similar to the connecting and operating manner of the tilting base 102, the first linkage 106, the second linkage 108, the third linkage 110 and the fourth linkage 112 in the first embodiment. The anti-rollover motorized vehicle of the third embodiment further includes a parking/locking mechanism 50. The parking/locking mechanism 50 includes two first rods 52, two second rods 54, two clipping elements 56, two actuators 58 and two elastic elements 59.

The two first rods 52 are pivoted to the first linkage 306 about a vertical axial direction D2 and located at opposite sides of the tilting base 302 respectively. The two second rods 54 are pivoted to the two first rods 52 respectively about the vertical axial direction D2 and located at opposite sides of the tilting base 302 respectively. The two clipping elements 56 are pivoted to the two second rods 54 respectively about the vertical axial direction D2 and clip the tilting base 302 to prevent the tilting base 302 from rotating about a horizontal axial direction D1. In other words, the first linkage 306, the second linkage 308, the third linkage 310 and the fourth linkage 312 are thus all fixed, such that the anti-rollover motorized vehicle is locked and prevented from tilting either when in parking status or travelling at very low speed. Thus, the drivers (especially physically handicapped people) can drive the anti-rollover motorized vehicle with high safety and convenience.

A driver or a pre-programmed device can operate the two actuators 58 disposed on the first linkage 306 to resist the elastic force of the two elastic elements 59 and push the two first rods 52 and the two second rods 54 to rotate to the state shown in FIG. 14, such that the two clipping elements 56 are moved away from the tilting base 302. Therefore, the tilting base 302 is no longer clamped by the clipping elements 56 and the locking state is disengaged. Thus, the tilting base 302, the first linkage 306, the second linkage 308, the third linkage 310 and the fourth linkage 312 are able to be operated from the locking state shown in FIG. 13 to the unlocking state shown in FIG. 14 to freely tilt the vehicle body of the anti-rollover motorized vehicle.

The driver or a pre-programmed device can also operate the two actuators 58 to stop pushing the first rods 52 and the second rods 54. After that, when the tilting base 302 rotates back and forth from the state shown in FIG. 14 to an upright posture at some instant as shown in FIG. 13, the first rods 52, the second rods 54 and the clipping elements 56 are momentarily restored to the state shown in FIG. 13 by the elastic forces of the elastic elements 59. Once the first rod 52 and the second rod 54 in one of the two toggle mechanisms are aligned with each other, the tilting base 302 can no longer swing over to this side, i.e., locked at this side. The other toggle mechanism will then wait for its moment to get locked in a similar way. Thus, the tilting base 302 will soon be stopped form rotating (or swing) about the horizontal axis, such that the anti-rollover motorized vehicle is locked. The actuators 58 of this embodiment could be electromechanical solenoids operated in either one direction or both directions, but the present invention is not limited to this. Besides, the elastic elements 59 of this embodiment could be torsional springs, but the present invention is not limited to this.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An anti-rollover motorized vehicle comprising a chassis, a front wheel and a rear two wheels assembly, the rear two wheels assembly comprising:
    a tilting base connected to the chassis through a first supporting structure;
    a four-bar linkage structure suitable for connecting the chassis with two rear wheels, wherein the four-bar linkage structure comprises:
        a first linkage pivoted to the tilting base and suitable for being pivoted relative to the tilting base;
        a second linkage disposed under and parallel to the first linkage, and pivoted to the tilting base, wherein the second linkage is suitable for being pivoted to the tilting base; and
        a third linkage and a fourth linkage pivoted to two ends of the first and second linkages respectively, and connected to supporting brackets of the two rear wheels, wherein when the chassis is tilted, the tilting base and the first supporting structure are tilted with the chassis, the first linkage and the second linkage are maintained at a constant angle relative to a road surface, and the third linkage and the fourth linkage are tilted with the chassis such that the two rear wheels are suitable for being tilted with the chassis; and
    two shock absorbers connected to the tilting base and suitable for being connected to the chassis through a second supporting structure, wherein when the chassis is tilted, the two shock absorbers are suitable for being tilted with the chassis, wherein the supporting brackets are not directly connected to the two shock absorbers.

2. The anti-rollover motorized vehicle as claimed in claim 1, wherein when the chassis is tilted, the four-bar linkage structure is suitable for maintaining the track width of the two rear wheels.

3. The anti-rollover motorized vehicle as claimed in claim 1, wherein the four-bar linkage structure is suitable for being acted with the two shock absorbers to move relatively to the chassis through the connection between the shock absorbers and the tilting base and the connection between the shock absorbers and the chassis, such that the chassis is provided with shock absorbing effect.

4. The anti-rollover motorized vehicle as claimed in claim 1, wherein the first linkage comprises a first right linkage and a first left linkage pivoted to each other, the second linkage comprises a second right linkage and a second left linkage pivoted to each other, the first right linkage and the first left linkage are pivoted to the second right linkage and the second left linkage through a T-shaped frame, and the first right linkage, the first left linkage, the second right linkage and the second left linkage form a right four-bar linkage structure and a left four-bar linkage structure located at two opposite sides of the T-shaped frame respectively.

5. The anti-rollover motorized vehicle as claimed in claim 4, further comprising two hydraulic pressure elements, wherein an end of each of the hydraulic pressure elements is pivoted to the T-shaped frame, the other end of each of the hydraulic pressure elements is pivoted to the first linkage or the second linkage, and when the chassis is tilted, the two hydraulic pressure elements are suitable for driving the right four-bar linkage structure and the left four-bar linkage structure.

6. The anti-rollover motorized vehicle as claimed in claim 5, wherein when the chassis is tilted, the right four-bar linkage structure and the left four-bar linkage structure are suitable for maintaining a track width of the two rear wheels.

7. The anti-rollover motorized vehicle as claimed in claim 5, wherein when the anti-rollover motorized vehicle stands upright, each of the two hydraulic pressure elements is also installed in an upright position.

8. The anti-rollover motorized vehicle as claimed in claim 7, further comprising two hydraulic pipes suitable for connecting the two hydraulic pressure elements.

9. The anti-rollover motorized vehicle as claimed in claim 8, wherein one of the hydraulic pipes comprises a solenoid valve suitable for controlling the flow of the hydraulic pipe between the two hydraulic pressure elements, in order to fix a specific tilting angle of the two rear wheels as required.

10. The anti-rollover motorized vehicle as claimed in claim 4, further comprising a linear slide, wherein the tilting base is suitable for moving upward and downward through the linear slide, and the right four-bar linkage structure and the left four-bar linkage structure are suitable for moving relatively to the chassis with the two shock absorbers, such that the chassis is provided with shock absorbing effect.

11. The anti-rollover motorized vehicle as claimed in claim 1, further comprising a parking/locking mechanism, wherein the parking/locking mechanism comprises:

two first rods pivoted to the first linkage about a vertical axial direction and located at two opposite sides of the tilting base respectively;

two second rods pivoted to the two first rods respectively about the vertical axial direction and located at two opposite sides of the tilting base respectively;

two clipping elements pivoted to the two second rods respectively about the vertical axial direction and clamping the tilting base, such that the tilting base is stopped from rotating about a horizontal axial direction perpendicular to the vertical axial direction; and two actuators disposed on the first linkage, wherein the two actuators are suitable for respectively pushing the two first rods and the two second rods to rotate in order to drive the two clipping elements to move away from the tilting base.

12. The anti-rollover motorized vehicle as claimed in claim 11, wherein the actuator is an electromechanical solenoid.

13. The anti-rollover motorized vehicle as claimed in claim 11, wherein the parking/locking mechanism further comprises two elastic elements, wherein each of the elastic elements is connected between the corresponding first rod and the corresponding first linkage to provide an elastic force for restoring the corresponding first rod.

\* \* \* \* \*